US007511742B2

(12) United States Patent
Ito et al.

(10) Patent No.: US 7,511,742 B2
(45) Date of Patent: Mar. 31, 2009

(54) DIGITAL CAMERA AND IMAGE SIGNAL GENERATING METHOD

(75) Inventors: Kenji Ito, Saitama-ken (JP); Kenji Funamoto, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 570 days.

(21) Appl. No.: 11/072,315

(22) Filed: Mar. 7, 2005

(65) Prior Publication Data
US 2005/0200726 A1 Sep. 15, 2005

(30) Foreign Application Priority Data
Mar. 12, 2004 (JP) ............................. 2004-071531

(51) Int. Cl.
H04N 5/76 (2006.01)
(52) U.S. Cl. ............................. 348/231.2; 348/333.02; 348/231.6; 348/556
(58) Field of Classification Search ................ 348/445, 348/636, 634, 635, 447, 558, 333.01, 333.02, 348/556
See application file for complete search history.

(56) References Cited
U.S. PATENT DOCUMENTS
4,789,961 A * 12/1988 Tindall ...................... 360/72.1

| | | | |
|---|---|---|---|
| 4,839,745 A * | 6/1989 | Tindall | 386/113 |
| 5,414,463 A * | 5/1995 | Katoh et al. | 348/240.2 |
| 6,765,612 B1 * | 7/2004 | Anderson et al. | 348/231.2 |
| 7,209,180 B2 * | 4/2007 | Takagi et al. | 348/558 |
| 2002/0054233 A1* | 5/2002 | Juen | 348/372 |
| 2004/0201764 A1* | 10/2004 | Honda et al. | 348/333.01 |
| 2005/0046725 A1* | 3/2005 | Sasagawa | 348/333.01 |

FOREIGN PATENT DOCUMENTS
| EP | 0 498 526 A1 | 8/1992 |
|---|---|---|
| JP | 2998156 B2 | 11/1999 |
| JP | 3097138 B2 | 8/2000 |

* cited by examiner

Primary Examiner—David L Ometz
Assistant Examiner—Quang V Le
(74) Attorney, Agent, or Firm—Birch, Stewart, Kolasch & Birch, LLP

(57) ABSTRACT

A digital camera and a image signal generating method capable of generating both an image signal for displaying an object image and additional information on a display component. and an image signal to be supplied to a connected external display device, with a simple configuration. Video additional information data is generated which includes in the period corresponding to the horizontal blanking period of the composite video signal digital data representing additional information to be displayed with the object image on the LCD, and in the period corresponding to the video period of the composite video signal digital data representing the object image. The digital data in the period corresponding to the horizontal blanking period is masked and a horizontal synchronizing signal and color burst are superimposed.

8 Claims, 8 Drawing Sheets

ADDITIONAL INFORMATION IMAGE

THROUGH IMAGE

24MHz

24MHz

WIDE TV SCREEN

BLANKING  THROUGH IMAGE

CONVENTIONAL TV SCREEN

THROUGH IMAGE

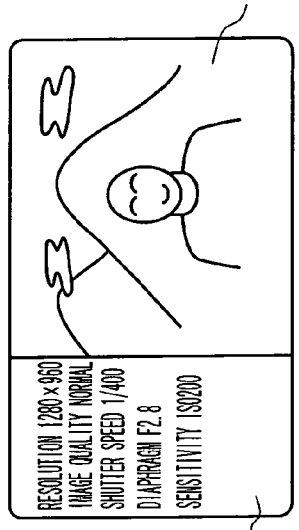
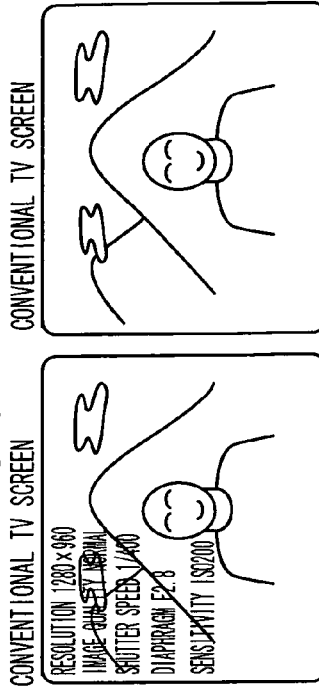
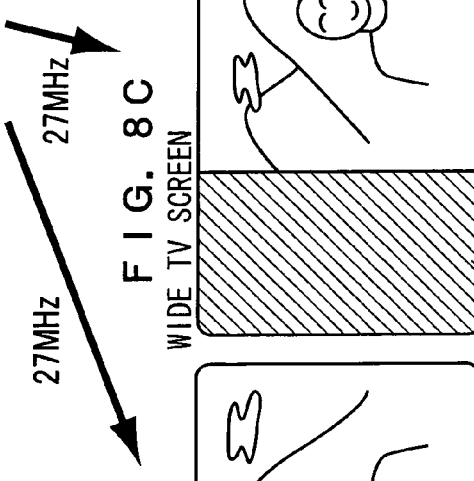
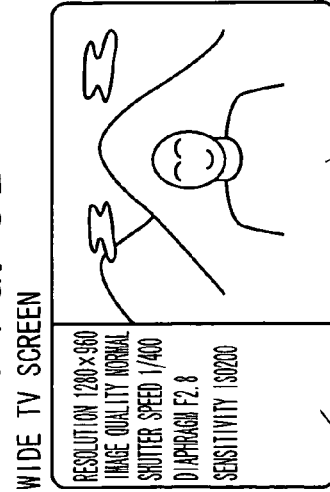

DIGITAL CAMERA AND IMAGE SIGNAL GENERATING METHOD

CROSS-REFERENCE TO RELATED APLLICATIONS

This application claims priority under 35 USC 119 from Japanese Patent Application No. 2004-71531, the disclosure of which is incorporated by reference herein.

BACKGROUND OF THE INVENTION

1. Field of the Invention

The present invention relates to a digital camera and an image signal generating method, in particular, a digital camera with a video output terminal for externally outputting a composite video signal having a set of a horizontal blanking period and a video period for each scanning line, and an image signal generating method of the digital camera.

2. Description of the Related Art

In recent years, the digital camera has become remarkably widespread and exceeds the film camera in annual shipments.

In the conventional digital camera, the aspect ratio of an image taken by an imaging element such as CCD and CMOS image sensor (object image) is generally set as 4:3. This corresponds with the aspect ratio of a conventional television receiver or a display region of a display device, such as liquid crystal display mounted on the digital camera as a monitor for the object image is 4:3.

On the other hand, television sets having the aspect ratio of the display region of 16:9 (so-called wide size) (hereinafter referred to as "wide TV") has gained in popularity recently and it is forecasted that the display device mounted on digital cameras with a display region of wide size will become widely used.

In this case, when the object image photographed by the digital camera using the imaging device with the aspect ratio of the photographed image of 4:3 is displayed on an external wide TV or the display device of wide size mounted as the monitor for the object image, blank region(s) are generated in part(s) of the display region, since the aspect ratio remains 4:3.

Thus, the display of various additional information, such as photographing conditions of the displayed object image, various icons and thumbnail images can be considered.

When a large image having an aspect ratio of 4:3 and small image(s) (corresponding to the above-mentioned additional information) are displayed in the display region having the aspect ratio of 16:9, the display position of each image in the horizontal direction is fixed. This may cause obstacles to the appreciation of each image depending on the installation position conditions of the image display device and so on. To prevent such obstacle(s), there is an art where the big image and the small image(s) can be optionally switched between display on the right side and the left side of the display region by the user's operation (refer to Japanese Patent No. 3097138, for example).

To provide a television set capable of properly displaying characters on a screen having a different aspect ratio when the image signal is displayed on the screen, according another related art, the display position of the characters (corresponding to the above-mentioned additional information) is changed in response to the display mode so that the characters are superimposed and displayed within the scope of the displayed image (refer to Japanese Patent No. 2998156, for example).

The conventional digital camera often has a video output terminal for outputting a composite video signal so that a photographed object image can be displayed on a television set.

To simultaneously display the object image and the additional information on a display device as a monitor for the object image mounted on a digital camera, since image signals and composite video signals supplied to the display device are greatly different from each other in specification, a digital camera of this kind requires separate image signal generating circuits systems by signal, thereby causing the problem of complicating configuration.

Since the technologies described in Japanese Patent No. 3097138 and Japanese Patent No. 2998156 fail to consider the provision of a video output terminal, these arts cannot overcome this problem.

SUMMARY OF THE INVENTION

The present invention has been made in view of the above circumstances and provides a digital camera and image signal generating method of simple configuration capable of: generating an image signal, for displaying an object image and additional information on a display component; and, supplying the image signal to the connected external display device.

To achieve the objectives of the invention, the digital camera according to a first aspect of the present invention has: an imaging component, for acquiring digital image data representing an object image by imaging; a display component, for displaying the object image thereon; a video output terminal, for externally outputting a composite video signal that represents the object image and has a set of a horizontal blanking period and a video period for each scanning line; a video additional information data generating component, for generating video additional information data which includes in the period corresponding to the horizontal blanking period of the composite video signal digital data representing additional information to be displayed with the object image on the display component, and in the period corresponding to the video period of the composite video signal the digital data representing the object image; a composite video signal generating component for generating the composite video signal by masking the digital data included in the video additional information data in the period corresponding to the horizontal blanking period, and imposing a horizontal synchronizing signal and a color burst signal in the horizontal blanking period, and supplying the signal to the video output terminal; and a display image signal generating component, for generating a display image signal for displaying the object image and the additional information on the display component based on the video additional information data, and supplying the signal to the display component.

With the digital camera according to the first aspect, digital image data representing the object image is acquired by imaging with the imaging component. The imaging component includes a solid state imaging device(s) such as CCD and CMOS image sensor(s).

The digital camera of the present invention has: the display component, for displaying the object image; and the video output terminal, for outputting a composite video signal that represents the object image, and has a set of horizontal blanking period and video period for each scanning line to the outside. The display component includes various display devices such as liquid crystal displays, CRT displays, plasma displays and organic EL displays.

In the digital camera of the present invention, the video additional information data generating component generates video additional information data which includes: in a period corresponding to the horizontal blanking period of the composite video signal digital data representing additional information to be displayed with the object image on the display component; and in a period corresponding to the video period of the composite video signal the digital data representing the object image to be displayed. This additional information includes photographing conditions concerning the object image, various icons and thumbnail images or the like.

According to the present invention, the composite video signal generating component masks the digital data included in the video additional information data in the period corresponding to the horizontal blanking period, then superimposes a horizontal synchronizing signal and a color burst signal in the horizontal blanking period, thereby generating the composite video signal. The composite video signal generating component supplies the composite video signal to the video output terminal. Also the display image signal, for displaying the object image and the additional information with the display component based on the video additional information data, is generated by a display image generating component and the display image signal is supplied to the display component.

That is, according to the present invention, both the composite video signal and the display image signal, for supply to the display component, can be generated based on the common data of the video additional information data (which includes the object information and the additional information), by using the period corresponding to the horizontal blanking period provided for each scanning line in the composite signal. Therefore, the apparatus becomes simplified in configuration in comparison with a case where the data for each of the signals is generated in separate systems.

As described above, the digital camera according to the first aspect has the imaging component for acquiring digital image data representing the object image by imaging, the display component for displaying the object image thereon, and the video output terminal for externally outputting a composite video signal that represents the object image and has a set of a horizontal blanking period and a video period for each scanning line. Furthermore, the digital camera generates video additional information data which: in the period corresponding to the horizontal blanking period of the composite video signal includes digital data representing additional information to be displayed with the object image on the display component; and in the period corresponding to the video period of the composite video signal includes the digital data representing the object image. In the camera the digital data included in the video additional information data in the period corresponding to the horizontal blanking period is masked, and then a horizontal synchronizing signal and a color burst signal in the horizontal blanking period is superimposed, thereby generating the composite video signal. This signal is supplied to the video output terminal. The camera also generates a display image signal, for displaying the object image and the additional information on the display component, based on the video additional information data and supplies the signal to the display component. Therefore, the image signal for displaying the object image and the additional information on the display component and the image signal for supplying the connected external display device can be generated with a simple configuration by the provided digital camera.

Preferably in the case where the aspect ratio of an display region of the external display device connected to the video output terminal is different from the aspect ratio of the object image the video additional information data generating component of the present invention sets the period to include the digital data representing the additional information as the period corresponding to the video period outside of the period including the digital data representing the object image of the period, rather than the period corresponding to the horizontal blanking period of the video additional information data. Thereby, additional information can be displayed simply on the external display device.

Preferably, the present invention further has a frequency switch component for switching the frequency of the video additional information data according to the aspect ratio of the display region of the external display device connected to the video output terminal. As a result, the composite video signal according to the external display device can be generated simply.

Preferably, the present invention further has an additional display state information acquiring component for acquiring additional display state information, representing whether or not the additional information is to be displayed on the external display device connected to the video output terminal. Here. when the additional display state information represents display of the additional information, the composite video signal generating component generates a signal in the video period in the composite video signal so as to display the additional information. This enables selectively setting whether or not the additional information is displayed on the external display device.

On the other hand, to achieve the above objective, an image signal generating method according to a second aspect of the present invention comprises: generating video additional information data which includes in the period corresponding to the horizontal blanking period of the composite video signal digital data representing additional information to be displayed with the object image on the display component, and in the period corresponding to the video period of the composite video signal includes the digital data representing the object image; generating the composite video signal by masking the digital data included in the video additional information data in the period corresponding to the horizontal blanking period and superimposing a horizontal synchronizing signal and a color burst signal in the horizontal blanking period; supplying the composite video signal to the video output terminal; generating a display image signal for displaying the object image and the additional information on the display component based on the video additional information data; and, supplying the signal to the display component.

The image signal generating method of the second aspect has the same effect as the digital camera of the first aspect, and therefore similarly to with the first aspect, the image signal for displaying the object image and the additional information on the display component and the image signal for supplying to the connected external display device can be generated with a simple configuration.

Preferably, in a case where the aspect ratio of a display region of the external display device connected to the video output terminal is different from the aspect ratio of the object image: the period which includes the digital data representing the additional information is set as a period corresponding to the video period of the video additional information data outside of the period which includes the digital data representing the object image, rather than the period corresponding to the horizontal blanking period of the video additional information data. Thereby, the additional information can be simply displayed on the external display device.

Preferably, in the present invention, the frequency of the video additional information data is switched according to the aspect ratio of the display region of the external display device connected to the video output terminal. Thereby, the frequency of the video additional information is configured to be based on the aspect ratio of the display region of the external display. As a result, the composite video signal according to the external display device can be generated with ease.

Preferably, in the present invention, additional display state information, representing whether or not the additional information is to be displayed on the external display device connected to the video output terminal, is acquired Here the signal in the video period in the composite video signal is generated so as to display the additional information when the additional display state information indicates the additional information should be displayed. Thereby, whether or not the additional information is displayed on the external display device can be selectively set.

According to the present invention, is provided: the imaging component, for acquiring digital image data representing an object image by imaging; the display component, for displaying the object image thereon; and the video output terminal, for outputting a composite video signal that represents the object image and has a set of a horizontal blanking period and a video period for each scanning line to the outside. Also generated is video additional information data which includes in the period corresponding to the horizontal blanking period of the composite video signal digital data representing additional information to be displayed with the object image on the display component, and in the period corresponding to the video period of the composite video signal digital data representing the object image. The composite video signal is generated by masking the digital data included in the video additional information data in the period corresponding to the horizontal blanking period, and then, a horizontal synchronizing signal and a color burst signal in the horizontal blanking period is superimposed. The composite video signal is supplied to the video output terminal. A display image signal, for displaying the object image and the additional information on the display component, is generated based on the video additional information data. This display image signal is supplied to the display component. Because of the above the effect of generating the image signal for displaying the object image and the additional information on the display component and the image signal to be supplied to the connected external display device can be obtained with a simple constitution.

BRIEF DESCRIPTION OF THE DRAWINGS

FIG. 8A is a schematic view showing an example of a displayed image on an LCD 38 of the digital camera 10 according to the second embodiment of the present invention;

FIG. 8B is a schematic view showing an example of a displayed image on the wide TV connected to the digital camera 10 according to the second embodiment of the present invention;

FIG. 8C is a schematic view showing another example of a displayed image on the wide TV connected to the digital camera 10 according to the second embodiment of the present invention;

FIG. 8D is a schematic view showing an example of a displayed image on a conventional TV connected to the digital camera 10 according to the second embodiment of the present invention; and FIG. 8E is a schematic view showing another example of a displayed image on the conventional TV connected to the digital camera 10 according to the second embodiment of the present invention.

DETAILED DESCRIPTION OF THE INVENTION

Embodiments of the present invention will be described in detail below with reference to the appended figures.

FIRST EMBODIMENT

Figure 1:
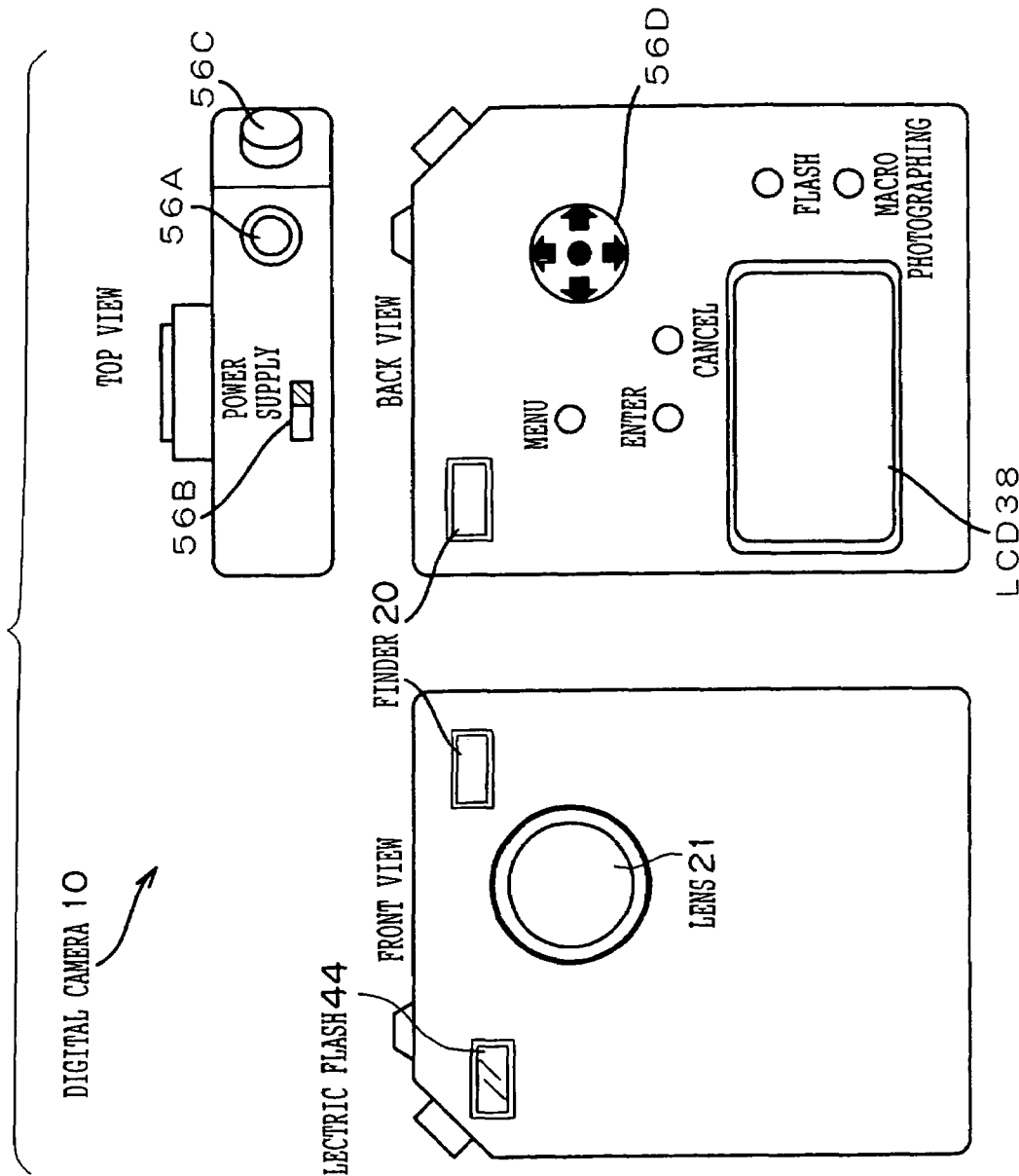
FIG. 1 is an outline view showing outlines of a digital camera according to an embodiment of the present invention.

Firstly, the outline configuration of a digital camera 10 according to this embodiment is described referring to FIG. 1.

As shown in FIG. 1, a front face of the digital camera 10 comprises a lens 21 for forming an image of an object, an electric flash 44 for emitting light to irradiate the object when photographing as required and a finder 20 used for determining the composition of the object to be photographed. A top face of the digital camera 10A comprises a release switch (so-called shutter) 56A which is operated by pressing when photographing, a power switch 56B and a mode changeover switch 56C.

The release switch 56A of the digital camera 10 according to the present embodiment is configured so as to detect the pressing operation in the following two levels: a state of being pressed up to an intermediate position (hereinafter referred to as "half-pressed state") and a state of being pressed up to a final pressing position beyond the intermediate position (hereinafter referred to as "full-pressed state").

In the digital camera 10, by bringing the release switch 56A into the half-pressed state, AE (Automatic Exposure) function works to set exposure condition (shutter speed, diaphragm, etc.) and then AF (Auto Focus) function works to control focus. Subsequently, by bringing the release switch 56A into the full-pressed state, exposure (photographing) is performed.

The mode changeover switch 56C is rotated when setting either one of a photo mode, for taking a picture, or a playback mode, for playing back the image of the object on a LCD 38 described later.

A back face of the digital camera 10 comprises an eyepiece part of the finder 20, a liquid crystal display (hereinafter referred to as "LCD") 38 for displaying the photographed image of the object, a menu screen or the like, and a cross cursor switch 56D. The cross cursor switch 56D is configured to include four arrow keys showing four moving directions of up, down, left and right in a display region of the LCD 38. The digital camera 10 according to the present embodiment employs a so-called wide-size display having an aspect ratio of the display region of 16:9 as the LCD 38.

A back face of the digital camera 10 further comprises a menu switch pressed for displaying the menu screen(s) on the LCD 38, a decision switch pressed for deciding previous operations, a cancel switch pressed for canceling an immediately preceding operation, a flash switch pressed for setting light emitting condition of the electric flash 44 and a macro photo switch pressed for performing macro photographing.

A side face of the digital camera 10 comprises a video output terminal 66 (refer to FIG. 2) for externally outputting a composite video signal.

Figure 2:
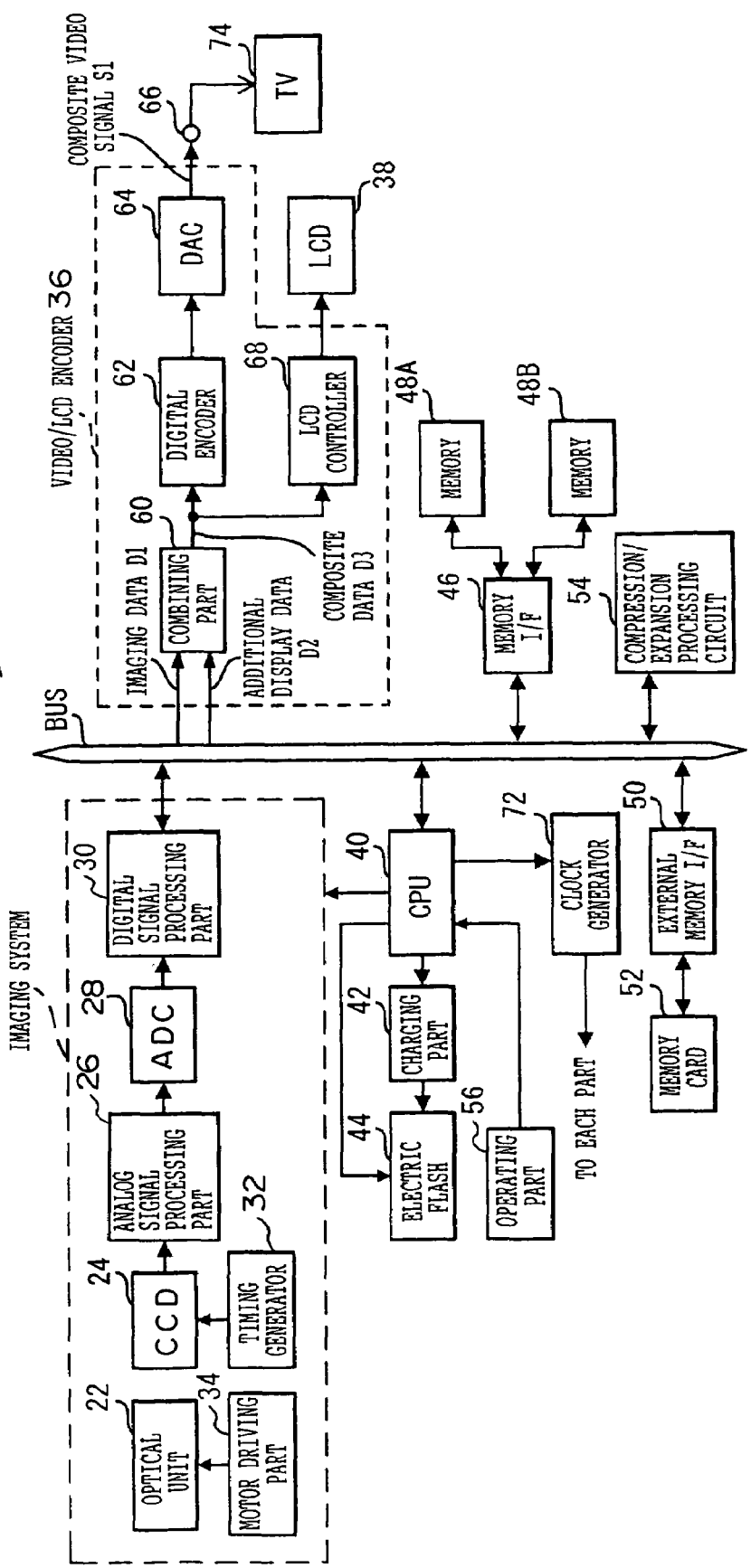
FIG. 2 is a block diagram showing the main configuration of an electrical system of the digital camera according to an embodiment of the present invention.

Next, the main configuration of an electric system of the digital camera 10 according to this embodiment will be described referring to FIG. 2.

The digital camera 10 comprises an optical unit 22 including the lens 21, a charge coupled device (hereinafter referred to as "CCD") 24 arranged at the rear on an optical axis of the lens 21 and an analog signal processing part 26 for performing various analog signal processing of an input analog signal.

The digital camera 10 is configured so as to have an analog/digital converter (hereinafter referred to as "ADC") 28 for converting the input analog signal into digital data, and a digital signal processing part 30 for performing various digital signal processing operations on the input digital data.

The digital signal processing part 30 has a built-in line buffer of specified capacity and allows the input digital data to be directly stored in a predetermined region of a memory 48A described later.

An output terminal of the CCD 24 is connected to an input terminal of the analog signal processing part 26, an output terminal of the signal processing part 26 is connected to an input terminal of the ADC 28 and an output terminal of the ADC 28 is connected to an input terminal of the digital signal processing part 30. Accordingly, an analog signal representing the object image output from the CCD 24 is subjected to a predetermined analog signal processing in the analog signal processing part 26 and converted into digital image data by the ADC 28 and then input to the digital signal processing part 30.

The digital camera 10 has a video/LCD encoder 36 that: generates an image signal, for displaying the image represented by the digital image data, the menu screen and so on; supplies the image signal to the LCD 38, on one hand. The video/LCD encoder 36 also: generates a composite video signal S1 (NTSC signal in this embodiment), for representing the image to be displayed on the LCD 38; and supplies the composite video signal to the video output terminal 66.

The video/LCD encoder 36 comprises: a combining part 60, for imaging data D1 and additional display data D2, which are described later, to be input into, and for combining the two kinds of data to be output as a composite data D3; a digital encoder 62, for receiving the composite data D3 output from the combining part 60 and generating digital data representing then, outputting the composite video signal S1 (described later) based on the composite data; and a digital/analog converter (hereinafter referred to as "DAC") 64 for converting the digital data output from the digital encoder 62 into an analog signal and supplying the analog signal as the composite video signal S1 to the video output terminal 66.

The video/LCD encoder 36 further comprises an LCD controller 68, for receiving the composite data D3 output from combining part 60 and generating an image signal to be supplied to the LCD 38 based on the composite data D3. The LCD controller 68 performs: pixel array conversion processing, of converting a pixel array of the object image represented by the imaging data D1 included in the composite data D3 into a pixel array for the LCD 38; pixel number conversion processing, of converting the number of pixels into that of the LCD 38; and, various other types of processing, such as gamma processing and sharpness processing according to characteristics of the LCD 38 with respect to the object image. However, since the above-mentioned operations of the LCD 38 are well known, further description thereof is omitted.

The digital camera 10 is configured so as to have: a CPU (Central Processing Unit) 40, for controlling the operation of the entire digital camera 10; a memory 48A, for temporarily storing the digital image data obtained by photographing therein; a memory 48B, for storing in advance specific information such as various parameters; and a memory interface 46, for controlling access to the memory 48A and the memory 48B.

Moreover, the digital camera 10 comprises an external memory interface 50, for making a portable memory card 52 accessible to the digital camera 10, and a compression/expansion processing circuit 54, for performing compression processing and expansion processing of the digital image data.

The digital camera 10 of this embodiment employs SDRAM (Synchronous DRAM) as the memory 48A, flash ROM as the memory 48B and Smart Media as the memory card 52.

The digital signal processing part 30, the video/LCD encoder 36, CPU 40, the memory interface 46, the external memory interface 50 and the compression/expansion processing circuit 54 are connected to each other via a system bus BUS. Therefore, the CPU 40 can control the actuation of the digital signal processing part 30, the video/LCD encoder 36 and the compression/expansion processing circuit 54, and control access via the memory interface 46 and the external memory interface 50 to the memory 48A and the memory 48B, and the memory card 52.

The digital camera 10 is provided with a timing generator 32, that generates a timing signal mainly for driving the CCD 24, and supplies the signal to the CCD 24, and the driving of the CCD 24 is controlled by the CPU 40 through the timing generator 32.

The digital camera 10 is further provided with a motor driving part 34 for the driving of a focus adjusting motor, a zoom motor and an aperture driving motor, all of which are disposed in the optical unit 22, and controlled by the CPU 40 through the motor driving part 34.

The lens 21 according to this embodiment has plural lenses, and is configured as a zoom lens capable of varying focal distance (variable power) and comprising a lens driving mechanism. The focus adjusting motor, the zoom motor and the diaphragm driving motor are included in the lens driving mechanism, and these respective motors each are driven by a driving signal supplied from the motor driving part 34 under control of the CPU 40.

The various switches (collectively referred to as "operating part 56" in this figure) such as the release switch 56A, the power switch 56B, the mode changeover switch 56C, the cross cursor switch 56D and a menu switch are connected to the CPU 40 and the CPU 40 can ascertain the operating state of the operating part 56 at all times.

The digital camera 10 is further provided with a charging part 42 that lies between the electric flash 44 and the CPU 40 and can be charged with power for light emission of the electric flash 44 according to control of the CPU 40. Further, the electric flash 44 is also connected to the CPU 40 and light emission of the electric flash 44 is controlled by the CPU 40.

The digital camera 10 is further provided with a clock generator 72 that: generates a clock signal, mainly for driving the video/LCD encoder 36; and supplies the signal to the video/LCD encoder 36. The driving of the video/LCD encoder 36 is controlled in synchronization with the clock signal. The clock generator 72 is connected to the CPU 40 and a frequency of the clock signal generated by the clock generator 72 can be set by the CPU 40.

The digital camera 10 according to this embodiment is configured so that selectively either of a television set having an aspect ratio of the display region of 4:3 (hereinafter referred to as "conventional TV") or a wide TV can be connected to the video output terminal 66. The digital camera 10 is configured so as to be able to set on a menu screen displayed on the LCD 38 a television set 74 (refer to FIG. 2.—hereinafter referred to as "TV 74") connected to the video output terminal 66 as either a conventional TV or a wide TV by pressing the menu switch.

Now, various data and signals relating to the video/LCD encoder 36 that play important roles in the present invention will be described in detail below with reference to FIGS. 3A to 3E. FIGS. 3A to 3E show various data and signals for one scanning line.

Figure 3A:
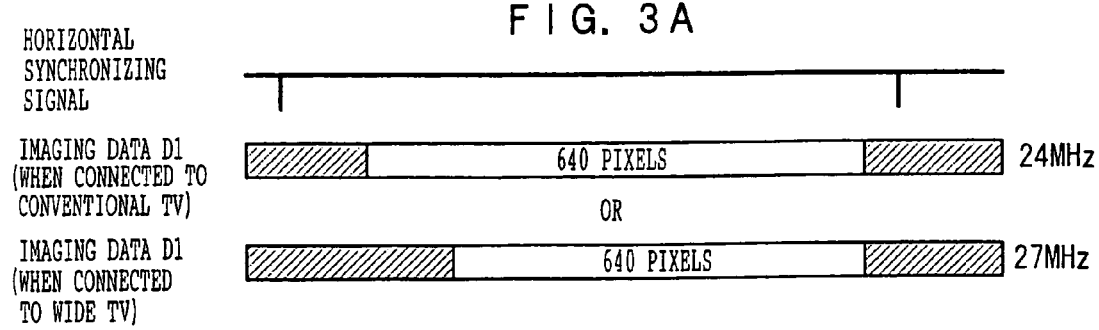
FIGS. 3A to 3E are time charts and a waveform chart showing states of various data and signals relating to a video/LCD encoder 36 according to embodiments of the present invention.

The imaging data D1, input to the combining part 60 of the video/LCD encoder 36, is data representing the image of the object which is digital data generated in the digital signal processing part 30. As shown in FIG. 3A, either of the following two kinds of data can be generated selectively under control of the CPU 40: data for which the frequency of the clock signal is set to 24 MHz, so as to correspond to a case where the TV 74 connected to the video output terminal 66 is a conventional TV; and, data of which the frequency of the clock signal is set to 27 MHz, so as to correspond to the case where the TV 74 connected to the video output terminal 66 is a wide TV.

Figure 3B:
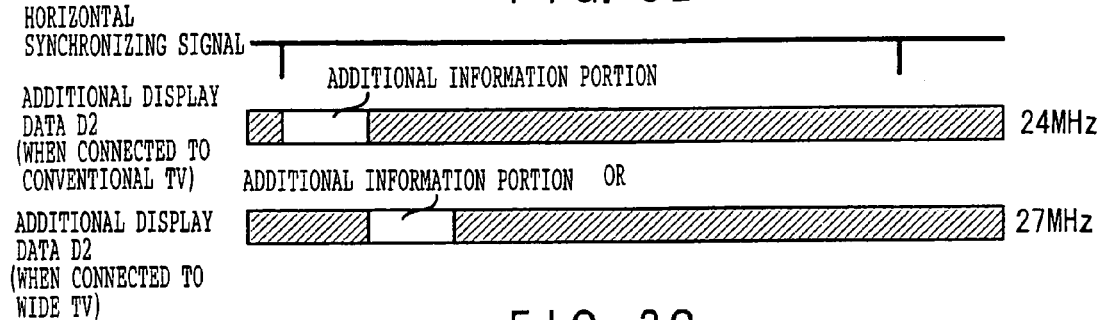
Figure 3C:
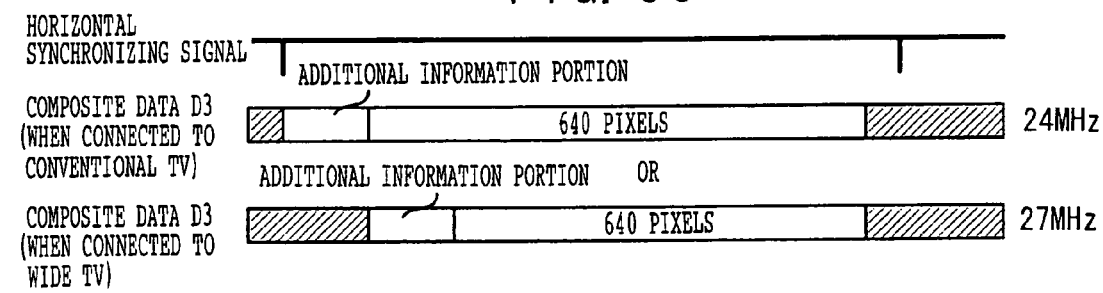
Figure 3D:
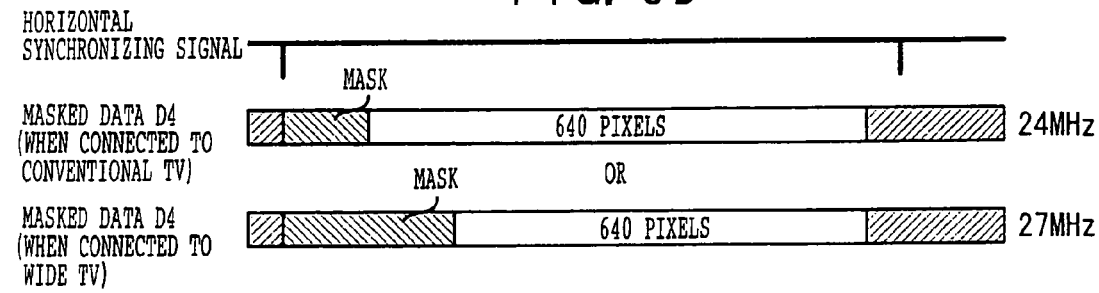
Figure 3E:
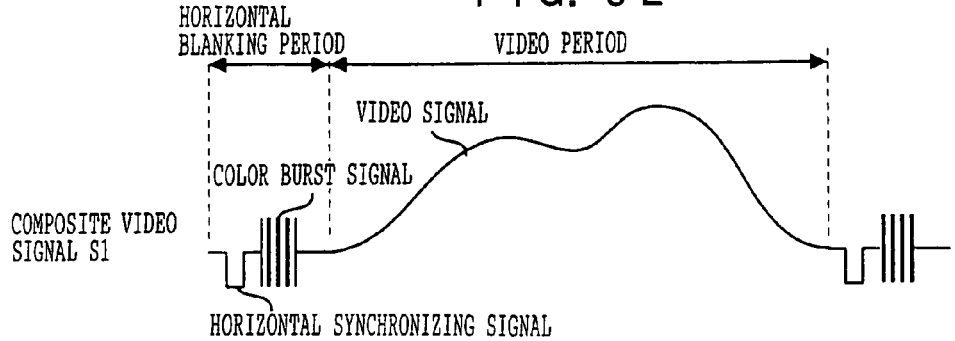

As shown in the figures, for each line in the horizontal direction of the object image represented by the imaging data D1, the imaging data D1 is generated so that pixel data of the corresponding line is packed up to the right edge side of a period corresponding to the video period of one scanning line in the composite video signal S1 (refer to FIG. 3E).

The additional display data D2 input to the combining part 60 is digital data representing additional information to be displayed with the object image on the LCD 38, and is data generated by the combining part 60 reading out data representing the additional information stored in advance in the memory 48B. As shown in FIG. 3B, similarly to the imaging data D1, either of the following two kinds of data is generated selectively under control of the CPU 40: data for which the frequency of the clock signal is set to 24 MHz, so as to correspond to a case where the TV 74 connected to the video output terminal 66 is a conventional TV; and, data for which the frequency of the clock signal is set to 27 MHz so as to correspond to a case where the TV 74 connected to the video output terminal 66 is a wide TV.

As shown in FIG. 3B, for each line in the horizontal direction of the additional information image represented by the additional display data D2, the additional display data D2 is generated so that when a conventional TV is connected to the video output terminal 66 the pixel data corresponding to the line of the above-mentioned additional information image is in a period corresponding to the horizontal blanking period (refer to FIG. 3E) in the composite video signal S1. However when a wide TV is connected to the video output terminal 66 the pixel data corresponding to the line of the above-mentioned additional information image is included in the video period (refer to FIG. 3E) in the composite video signal S1 outside of the period in which the data representing the object image in the imaging data D1 is included.

With the digital camera 10 according to this embodiment, icon information playing a predetermined role is applied as the above-mentioned additional information. However, the additional information is not limited to icon information and information representing photographing conditions set in the digital camera 10, information representing thumbnail images or the like are also applicable.

In the combining part 60, the imaging data D1 and the additional display data D2 thus generated are combined, and the composite data D3 (corresponding to "video additional information data") as shown in FIG. 3C is generated and output to the digital encoder 62 and the LCD controller 68.

As shown in the FIG. 3C, the composite data D3 thus generated includes digital data representing the additional information in either the horizontal blanking period in the composite video signal S1, or a period corresponding to a blank period of the video period, and digital data representing the object image in the period corresponding to the video period in the composite video signal S1.

To the composite data D3 input from the combining part 60, the digital encoder 62: when a conventional TV is connected to the video output terminal 66 masks the digital data included in the period corresponding to the horizontal blanking period of the composite video signal S1 (that is, data representing the additional information); when a wide TV is connected to the video output terminal 66, masks the period including the data representing the additional information in the period corresponding to the video period of the composite video signal S1 in addition to the period corresponding to the horizontal blanking period of the composite video signal S1; and then superimposes digital data of a horizontal synchronizing signal and a color burst signal of the composite video signal S1 in a period corresponding to the horizontal blanking period; thereby generating digital data representing the composite video signal S1 to output to the DAC 64.

FIG. 3D shows masked data D4 as the data masked in the digital encoder 62. The digital encoder 62 according to this embodiment performs the above-mentioned masking by making the digital data in the masking period to be the same level as the black level of the imaging data D1.

As a result, an example of the composite video signal S1 supplied from the DAC 64 to the video output terminal 66 is shown in FIG. 3E and the object image can be normally displayed on the TV 74 connected to the video output terminal 66.

Next, the general operation of the digital camera 10 according to this embodiment when photographing will be described briefly.

Firstly, the CCD 24 picks up an image of the object through the optical unit 22 and outputs an analog signal for each of R (red), G (green) and B (blue) representing the object image to the analog signal processing part 26 sequentially. The analog signal processing part 26 applies analog signal processing, such as correlated double sampling processing, to the analog signals input from the CCD 24 and outputs the processed signals to the ADC 28 sequentially.

The ADC 28 converts the analog signal for each R, G and B input from the analog signal processing part 26 into respectively R, G and B signals of 12 bits (digital image data), and outputs the signals to the digital signal processing part 30 sequentially. The digital signal processing part 30 accumulates the digital image data sequentially input from the ADC 28 in a built-in line buffer and stores the data in a predetermined region of the memory 48A directly.

The digital image data stored in the predetermined region of the memory 48A is read out by the signal processing part 30 according to the control of the CPU 40, and a digital gain is applied depending on a predetermined physical quantity for white balance adjustment, and gamma processing and sharpness processing are preformed to generate digital image data of 8 bits.

Subsequently, the signal processing part 30 applies YC signal processing to the generated digital image data of 8 bits to generate a luminance signal and chroma signals Cr and Cb (hereinafter referred to as "YC signal"), stores the YC signal in a region other than the predetermined region of the memory 48A and outputs the signal to the combining part 60 as the imaging data D1.

The LCD 38 is configured so as to serve as a finder by displaying a dynamic image (through image) obtained by sequential imaging with the CCD 24. In the case where the LCD 38 is used as the finder, the video/LCD encoder 36: acquires the additional display data D2, by reading out the data representing the additional information stored in the memory 48B into the combining part 60; combines the additional display data D2 with the imaging data D1 input from the signal processing part 30 sequentially; generates the composite data D3 in real time; and, outputs the data D3 to the digital encoder 62 and the LCD controller 68.

Using the composite data D3 input from the combining part 60, the LCD controller 68 generates an image signal capable of supplying to the LCD 38 by use of conventional known technology and outputs the signal sequentially. This allows the LCD 38 to display the through image thereon.

On the other hand, the digital encoder 62 generates digital data representing the composite video signal S1, based of the composite data D3 input from the combining part 60 as mentioned above, and outputs the digital data to the DAC 64 sequentially. As a result, the composite video signal S1 representing the through image is supplied to the video output terminal 66 sequentially.

Here, as described above, the AE function operates to set exposure conditions at the timing at which the release switch 56A is brought into the half-pressed state by the user, and then the AF function operates to control focus. Subsequently, at the timing at which the release switch 56A is brought into the full-pressed state, the YC signal stored in the memory 48A is compressed with a predetermined compression format (JPEG format in this embodiment) in the compression/expansion processing circuit 54, and then recorded in the memory card 52 through the external memory interface 50.

The digital camera 10 according to this embodiment performs connected TV switch processing when the user sets the TV 74 connected to the video output terminal 66 to be a conventional TV or a wide TV on the menu screen displayed on the LCD 38 by pressing the menu switch.

Figure 4:
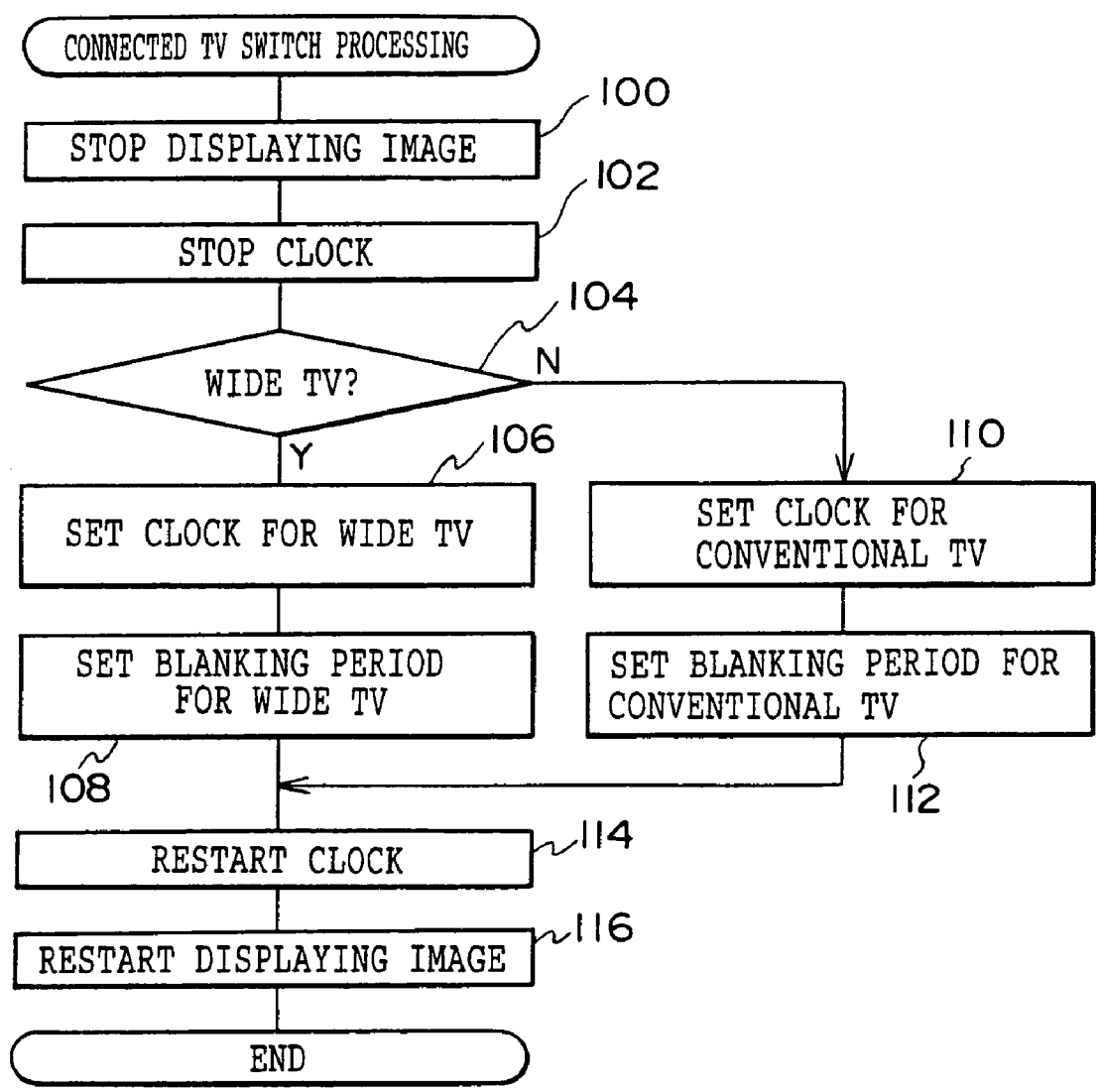
FIG. 4 is a flow chart showing a process flow of a connected TV switch processing program according to a first embodiment of the present invention.

Next, the operation of the digital camera 10 when performing the connected TV switch processing will be described with reference to FIG. 4. FIG. 4 is a flow chart showing a process flow of a connected TV switch processing program executed in the CPU 40 of the digital camera 10 and the program is stored in advance in a predetermined region of the memory 48B. The case where the through image is displayed on the LCD 38 and the TV 74 will be described.

At a step 100 of the figure, by stopping the operation of the digital encoder 62 and the LCD controller 68, display of the through image on the TV 74 and the LCD 38 is stopped and at a next step 102, operation of the clock generator 72 is stopped.

At a next step 104, it is determined whether or not the kind of TV 74 set by the user is a wide TV, and when it is determined that the TV 74 is a wide TV, the operation proceeds to a step 106.

At the step 106, with respect to the clock generator 72, the frequency of the clock signal supplied to the video/LCD encoder 36 is set to be the frequency for wide a TV (27 MHz). At a next step 108, with respect to the digital encoder 62, the above-mentioned processing in the period corresponding to the horizontal blanking period and the video period of the composite data D3 input from the combining part 60 is set for a wide TV (the digital data in the period corresponding to the horizontal blanking period and the period outside of the period which includes the digital data representing the object image in the video period is masked, and the digital data corresponding to the horizontal synchronizing signal and the color burst signal in the period corresponding to the horizontal blanking period is superimposed onto the masked digital data) and the operation proceeds to a step 114.

On the other hand, when it is determined that the TV 74 is not a wide TV, it is assumed that the kind of TV 74 set by the user is a conventional TV and the operation proceeds to a step 110. At the step 110, with respect to the clock generator 72, the frequency of the clock signal supplied to the video/LCD encoder 36 is set to be the frequency for a conventional TV (24 MHz). At a next step 112, with respect to the digital encoder 62, the processing in the period corresponding to the horizontal blanking period of the composite data D3 input from the combining part 60 is set for a conventional TV (the digital data in the period corresponding to the horizontal blanking period is masked and the digital data corresponding to the horizontal synchronizing signal and the color burst signal in the period corresponding to the horizontal blanking period is superimposed onto the masked digital data), and the operation proceeds to a step 114.

At the step 114, the operation of the clock generator 72, stopped at the step 102, is started again and at a next step 116, the operation of the digital encoder 62 and the LCD controller 68, stopped at the step 100, is started again and then the connected TV switch processing program is finished.

Figure 5:
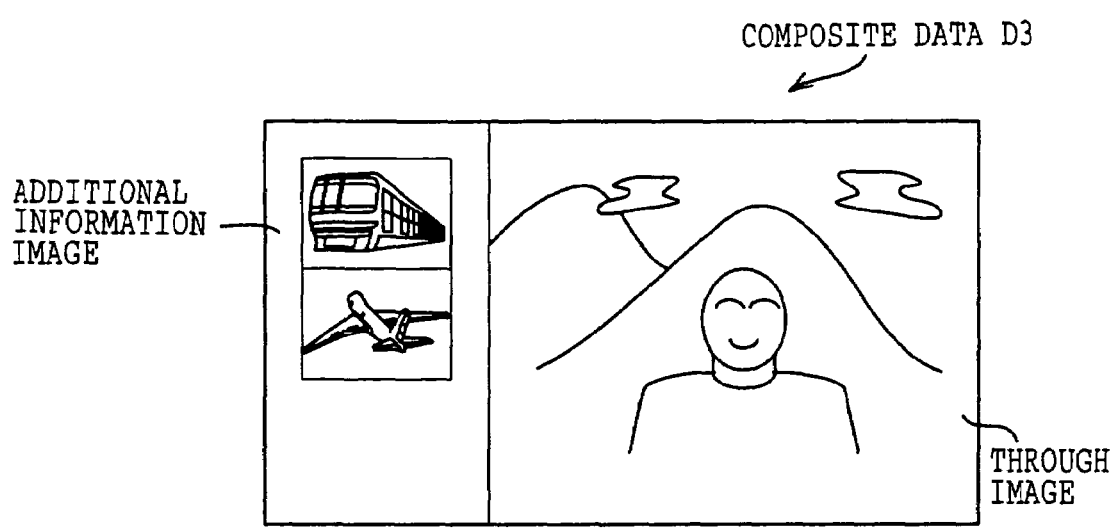
FIG. 5 is a schematic view showing an example of an image represented by composite data D3 according to the first embodiment of the present invention.
Figure 6A:
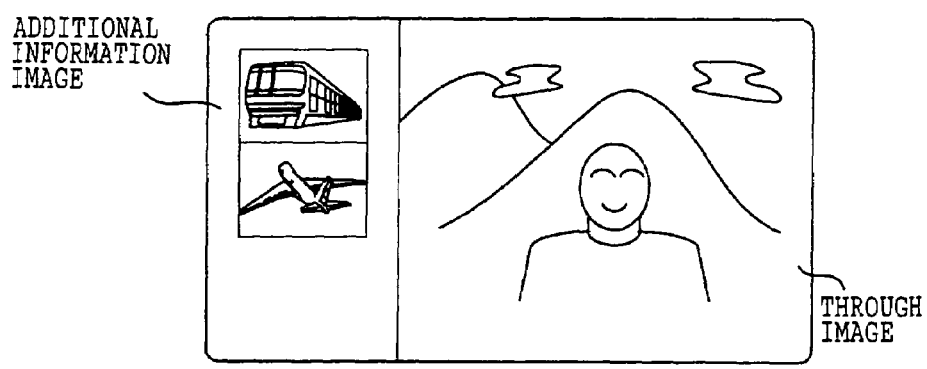
FIG. 6A is a schematic view showing an example of a displayed image on an LCD 38 of the digital camera 10 according to the first embodiment of the present invention.
Figure 6B:
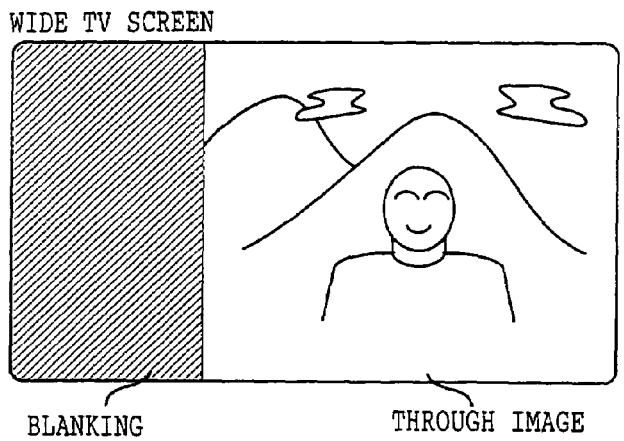
FIG. 6B is a schematic view showing an example of a displayed image on a wide TV connected to the digital camera 10 according to the first embodiment of the present invention.
Figure 6C:
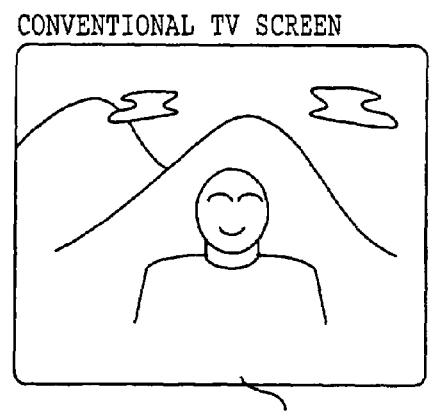
FIG. 6C is a schematic view showing an example of a displayed image on a conventional TV connected to the digital camera 10 according to the first embodiment of the present invention.

According to the connected TV switch processing, for example, when the composite data D3 is as shown in FIG. 5, an image similar to the image shown in FIG. 5 is displayed on the LCD 38 as shown in FIG. 6A. Regarding the TV display, when the TV 74 is a wide TV, as shown in FIG. 6B, an image in which the region for the additional information image of the image displayed on the LCD 38 is in a blanking state is displayed on the TV 74 connected to the video output terminal 66, and when the TV 74 is a conventional TV, as shown in FIG. 6C, only the object image is displayed.

The case where the photo mode is set and the through image is displayed on the LCD 38 and the TV 74 is described above. However, the case where a playback mode is set, and the object image shown by the digital image data recorded in the memory card 52 is displayed on the LCD 38 and the TV 74, the video/LCD encoder 36 also operate in a similar manner to the above-mentioned operations. In this case, however, the digital signal processing part 30 reads out the digital image data representing the object image from the memory card 52 and generates the imaging data D1 in the above-mentioned format to output the imaging data D1 to the combining part 60.

As described in detail, according to this embodiment, the digital camera 10 comprises: an imaging component (CCD 24), for acquiring digital image data representing an object image by imaging; a display component (LCD 38), for displaying the object image thereon; and a video output terminal, for outputting a composite video signal that represents the object image and has a set of a horizontal blanking period and a video period for each scanning line to the outside. Furthermore the digital camera 10: includes digital data representing additional information, to be displayed with the object image on the display component in the period corresponding to the horizontal blanking period of the composite video signal; generates video additional information data (composite data D3), including the digital data representing the object image in the period corresponding to the video period of the composite video signal; masks the digital data included in the video additional information data, in the period corresponding to the horizontal blanking period; superimposes a horizontal synchronizing signal and a color burst signal in the horizontal blanking period, thereby generating the composite video signal to supply the signal to the video output terminal; generates a display image signal, for displaying the object image and the additional information on the display component based on the video additional information data; and, supplies the signal to the display component. Because of this configuration an image signal for displaying the object image and the additional information on the display component and an image signal for supplying to the connected external display device (TV 74) can be generated with a simple configuration.

Further, according to this embodiment, since in the case where the aspect ratio of an display region of the external display device connected to the video output terminal is different from the aspect ratio of the object image (the case where the TV 74 is the wide TV) the period which includes the digital data representing the additional information is defined as a period corresponding to the video period of the video additional information data outside of the period including the digital data representing the object image, display of the additional information on the external display device can be performed simply. Specifically, this can be achieved by setting the digital encoder 60 so as to mask only the period corresponding to the horizontal blanking period of the composite data D3 input from the combining part 60 at the step 108 of the connected TV switch processing program.

Further, according to this embodiment, since the frequency of the video additional information data is switched according to the aspect ratio of the display region of the external display device connected to the video output terminal, the frequency of the video additional information data can be made according to the aspect ratio of the display region of the external display device and therefore, the composite video signal according to the external display device can be generated simply.

SECOND EMBODIMENT

This second embodiment describes a case where it can be selectively set as to whether or not the additional information is displayed on the TV 74 connected to the video output terminal 66.

A digital camera according to the second embodiment is different from the digital camera 10 according to the first embodiment (refer to FIG. 1 and FIG. 2) in that the digital encoder 62 also has a function of combining the additional information so as to be displayed at any position of the object image. Also it can be set as to whether or not the additional information is displayed on the TV 74 connected to the video output terminal 66 using the cross cursor switch 56 control on a menu screen displayed on the LCD 38 by the pressing of the menu switch.

Figure 7:
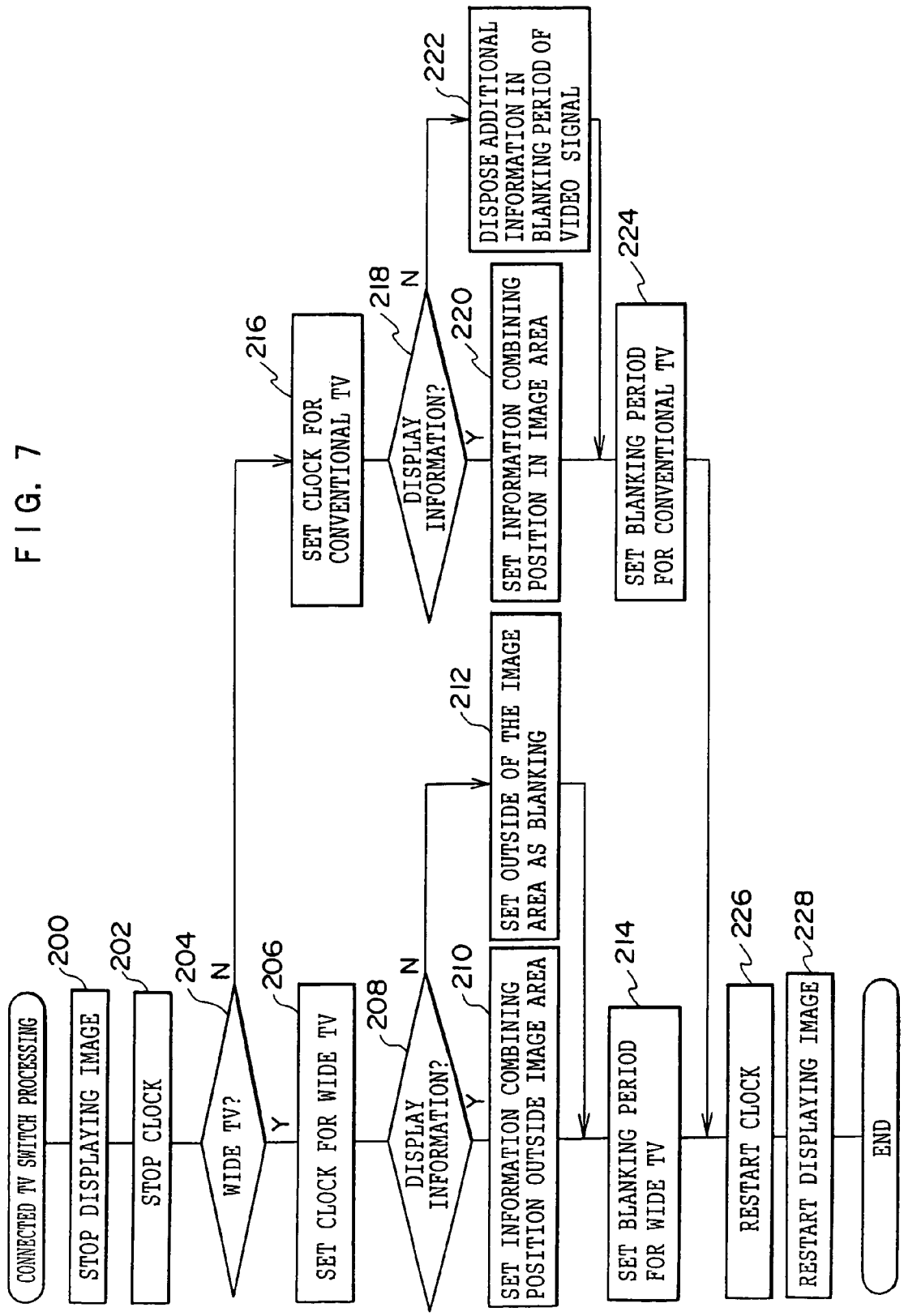
FIG. 7 is a flow chart showing a process flow of a connected TV switch processing program according to a second embodiment of the present invention.

Next, the operation of the digital camera 10 according to the second embodiment when performing the connected TV switch processing will be described with reference to FIG. 7. FIG. 7 is a flow chart showing a process flow of a connected TV switch processing program executed in the CPU 40 of the digital camera 10 and the program is stored in advance in a predetermined region of the memory 48B. The case where the through image is displayed on the LCD 38 and the TV 74 will be described.

At a step 200 of the figure, by stopping operation of the digital encoder 62 and the LCD controller 68, display of the through image on the TV 74 and the LCD 38 is stopped and at a next step 202, operation of the clock generator 72 is stopped.

At a next step 204, it is determined whether or not the kind of TV 74 set by the user is a wide TV and when it is determined that the TV 74 is a wide TV, the operation proceeds to a step 206.

At the step 206, with respect to the clock generator 72, the frequency of the clock signal supplied to the video/LCD encoder 36 is set to be the frequency for the wide TV (27 MHz). At a next step 208, it is determined whether or not the user has set display of the additional information. When it is determined that the user sets this display, the operation proceeds to a step 210 and with respect to the digital encoder 62, the composed position of the additional information is set to be outside of the object image area and the operation proceeds to a step 214.

On the other hand, when it is determined that the user does not set display of the additional information at the step 208, it is assumed that the user does not set display of the additional information and the operation proceeds to a step 212. At the step 212, with respect to the digital encoder 62, the area outside of the object image area is set to blanking and the operation proceeds to a step 214.

At the step 214, with respect to the digital encoder 62, the processing in the period corresponding to the horizontal blanking period of the composite video signal D3 input from the combining part 60 (processing of superimposing the horizontal synchronizing signal and the color burst signal after masking) is set for a wide TV and the operation proceeds to a step 226.

On the other hand, when it is determined in step 204 that the TV 74 is not a wide TV, the kind of TV 74 set by the user is assumed to be a conventional TV and the operation proceeds to a step 216. At the step 216, with respect to the clock generator 72, the frequency of the clock signal supplied to the video/LCD encoder 36 is set to be the frequency for a conventional TV (24 MHz). At a next step 218, it is determined whether or not the user sets display of the additional information and when it is determined that the user sets it, the operation proceeds to a step 220 and with respect to the digital encoder 62, the composed position of the additional information is set to fall within the object image area and the operation proceeds to a step 224.

On the other hand, when it is determined that the user does not set display of the additional information at the step 218, it is assumed that the user does not set display of the additional information and the operation proceeds to a step 222. At the step 222, with respect to the digital encoder 62, it is set to dispose the additional information in the period corresponding to the horizontal blanking period of the composite video signal S1 and the operation proceeds to a step 224.

At the step 224, with respect to the digital encoder 62, the processing in the period corresponding to the horizontal blanking period of the composite data D3 input from the combining part 60 is set for a conventional TV and the operation proceeds to the step 226.

At the step 226, the operation of the clock generator 72 stopped at the step 202 is started again and at a next step 228, the operation of the digital encoder 62 and the LCD controller 68 stopped at the step 200 is started again and then the connected TV switch processing program is finished.

According to the connected TV switch processing, for example, when the image displayed on the LCD 38 is as shown in FIG. 8A in the case where TV 74 is a wide TV and the user sets display of the additional information, an image similar to the image displayed on the LCD 38 is displayed on the TV 74 connected to the video output terminal 66 as shown in FIG. 8B.

On the contrary, in the case where TV 74 is a wide TV and the user does not set display of the additional information, an image in which the region for the additional information image of the image displayed on the LCD 38 is in a blanking state is displayed on the TV 74 as shown in FIG. 8C.

On the other hand, in the case where TV 74 is the conventional TV and the user sets display of the additional information, as an example, an image in which the additional information is superimposed at an arbitrary position of the object image displayed on the LCD 38 is displayed on the TV 74 as shown in FIG. 8D.

On the other hand, in the case where TV 74 is the conventional TV and the user does not set display of the additional information, as an example, only the object image displayed on the LCD 38 is displayed on the TV 74 as shown in FIG. 8E.

The case where the photo mode is set and the through image is displayed on the LCD 38 and the TV 74 is described above. However, also in the case where the playback mode is set and the object image shown by the digital image data recorded in the memory card 52 is displayed on the LCD 38 and the TV 74, the video/LCD encoder 36 operate in a similar manner to the above-mentioned operations. In this case, however, the digital signal processing part 30 reads out the digital image data representing the object image to be read out from the memory card 52 and generates the imaging data D1 in the above-mentioned format to output to the combining part 60.

As described in detail, according to this embodiment, the same effect as in the first embodiment can be achieved. Also it is possible to selectively set whether or not the additional information is displayed on the external display device since: the additional display state information, representing whether or not the additional information is displayed on the external display device connected to the video output terminal, is acquired (that is the information representing whether or not the additional information is to be displayed on the TV 74 connected to the video output terminal 66, which is set using the cross cursor switch 56D control on a menu screen displayed on the LCD 38 by the pressing of the menu switch); and, the signal in the video period in the composite video signal is generated so as to display the additional information when the additional display state information indicates display of the additional information.

Each of the embodiments describe how the data representing the additional information is combined in the period corresponding to the video period in the composite data D3 when the TV 74 is a wide TV. However, the present invention is not limited to this, and for example, the additional information can also be combined in the period corresponding to the horizontal blanking period when the TV 74 is a wide TV as in the case of a conventional TV. In this case, the same effect can be achieved as in these embodiments.

Further, the process flows of various processing programs described in the embodiments (refer to FIG. 4 and FIG. 7) are only examples and therefore can be changed as appropriate in line with the spirit of the present invention.

Furthermore, the configuration of the digital camera 10 described in the embodiments (refer to FIG. 1 and FIG. 2) is only an example and therefore can be changed as appropriate in line with the spirit of the present invention.

What is claimed is:

1. A digital camera comprising:
   an imaging component for acquiring digital image data representing an object image by imaging;
   a display component for displaying the object image thereon;
   a video output terminal for externally outputting a composite video signal that represents the object image and has a set of a horizontal blanking period and a video period for each scanning line;
   a video additional information data generating component for generating video additional information data which includes
      in a period corresponding to the horizontal blanking period of the composite video signal, digital data representing additional information to be displayed with the object image on the display component, and
      in a period corresponding to the video period of the composite video signal, the digital data representing the object image to be displayed;
   a composite video signal generating component, for generating the composite video signal by masking the digital data included in the video additional information data in the period corresponding to the horizontal blanking period and then superimposing a horizontal synchronizing signal and a color burst signal in the horizontal blanking period, and for supplying the composite video signal to the video output terminal; and
   a display image signal generating component, for generating a display image signal for displaying the object image and the additional information on the display component based on the video additional information data and supplying the display image signal to the display component.

2. The digital camera of claim 1, wherein, when the aspect ratio of a display region of an external display device connected to the video output terminal is different from the aspect ratio of the object image, the video additional information data generating component sets a period that includes the digital data representing the additional information as a period corresponding to the video period of the video additional information data outside of a period including the digital data representing the object image, rather than the period corresponding to the horizontal blanking period of the video additional information data.

3. The digital camera of claim 1 further comprising a frequency switching component for switching the frequency of the video additional information data according to the aspect ratio of the display region of the external display device connected to the video output terminal.

4. The digital camera of claim 1 further comprising an additional display state information acquiring component for acquiring additional display state information representing whether or not the additional information is to be displayed on an external display device connected to the video output terminal, wherein the composite video signal generating component generates a signal in the video period of the composite video signal so as to display the additional information when the additional display state information indicates the additional information should be displayed.

5. An image signal generating method for a digital camera having an imaging component for acquiring digital image data representing an object image by imaging, a display component for displaying the object image thereon, and a video output terminal for externally outputting a composite video signal that represents the object image and has a set of a horizontal blanking period and a video period for each scanning line, the image signal generating method comprising:

generating video additional information data, which includes in a period corresponding to the horizontal blanking period of the composite video signal, digital data representing additional information which is to be displayed on the display component with the image object, and in a period corresponding to the video period of the composite video signal, the digital data representing the object image to be displayed;

generating the composite video signal by masking the digital data included in the video additional information data in the period corresponding to the horizontal blanking period and then superimposing a horizontal synchronizing signal and a color burst signal in the horizontal blanking period;

supplying the composite video signal to the video output terminal;

generating a display image signal for displaying the object image and the additional information on the display component based on the video additional information data; and, supplying the display image signal to the display component.

6. The image signal generating method of claim 5, wherein, when the aspect ratio of a display region of an external display device connected to the video output terminal is different from the aspect ratio of the object image, the period that includes the digital data representing the additional information is set as a period corresponding to the video period of the video additional information data outside of a period that includes the digital data representing the additional information, rather than the period corresponding to the horizontal blanking period of the video additional information data.

7. The image signal generating method of claim 5, wherein the frequency of the video additional information data is switched according to the aspect ratio of the display region of an external display device connected to the video output terminal.

8. The image signal generating method of claim 5 further comprising acquiring additional display state information representing whether or not the additional information is to be displayed on an external display device connected to the video output terminal, wherein the signal in the video period in the composite video signal is generated so as to display the additional information when the additional display state information indicates the additional information should be displayed.

* * * * *